US008520499B2

(12) United States Patent
Kwon et al.

(10) Patent No.: US 8,520,499 B2
(45) Date of Patent: Aug. 27, 2013

(54) METHOD, APPARATUS, AND SYSTEM FOR TRANSMITTING AND RECEIVING INFORMATION OF AN UNCODED CHANNEL IN AN ORTHOGONAL FREQUENCY DIVISION MULTIPLEXING SYSTEM

(75) Inventors: Hwan-Joon Kwon, Hwaseong-si (KR); Ju-Ho Lee, Suwon-si (KR); Joon-Young Cho, Suwon-si (KR); Jin-Kyu Han, Suwon-si (KR); Dong-Hee Kim, Yongin-si (KR); Yun-Ok Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 905 days.

(21) Appl. No.: 11/417,217

(22) Filed: May 4, 2006

(65) Prior Publication Data

US 2006/0280256 A1    Dec. 14, 2006

(30) Foreign Application Priority Data

May 4, 2005  (KR) .................. 10-2005-0037777

(51) Int. Cl.
 *H04J 11/00*  (2006.01)
 *H04K 1/10*  (2006.01)
 *H04L 27/28*  (2006.01)
 *H04J 13/00*  (2011.01)

(52) U.S. Cl.
 CPC ................................. *H04J 13/0048* (2013.01)
 USPC .......................................... 370/209; 375/260

(58) Field of Classification Search
 CPC ..... H04L 5/0007; H04L 5/0055; H04L 5/001; H04L 1/1893; H04J 13/18; H04J 11/00; H04J 13/0048
 USPC ..... 370/395.6, 203–211, 267, 329; 375/260, 375/267, 299, 347; 455/101
 See application file for complete search history.

(56) References Cited

U.S. PATENT DOCUMENTS 5,757,767 A * 5/1998 Zehavi ........................... 370/208
6,577,608 B1 * 6/2003 Moon et al. .................... 370/311

(Continued)

FOREIGN PATENT DOCUMENTS

CN     1525674       9/2004
JP   2004-511995 A   4/2004

(Continued)

OTHER PUBLICATIONS

Raulefs, R.; Dammann, A.; Sand, S.; Kaiser, S.; Auer, G.; "Rotated spreading matrices in a coded MC-CDMA system", Spread Spectrum Techniques and Applications, 2004 IEEE Eighth International Symposium on Aug. 30-Sep. 2, 2004 pp. 688-693.

(Continued)

*Primary Examiner* — Ayaz Sheikh
*Assistant Examiner* — Hoang-Chuong Vu
(74) *Attorney, Agent, or Firm* — Jefferson IP Law, LLP (57) ABSTRACT

A method, apparatus and system for efficiently transmitting and receiving channels are provided in a wireless communication system based on Orthogonal Frequency Division Multiplexing (OFDM). A multiplexing scheme differs according to a channel when a transmitter transmits a packet data channel, a common control channel and a control channel designated for a particular user. Uncoded 1-bit information is broadly dispersed in frequency and time domains using multiplexing technology for maximizing diversity gain in a channel for transmitting information of at least one bit to a particular user like an acknowledgement (ACK) channel. The transmitter converts a sequence obtained by multiplexing multiple bits to be transmitted to a plurality of users to parallel signals, and broadly disperses the parallel signals in the time and frequency domains. When the uncoded 1-bit information is transmitted, reception reliability is improved because channel coding and transmission are efficiently performed using a small amount of resources.

44 Claims, 12 Drawing Sheets

(56) References Cited

U.S. PATENT DOCUMENTS

| | | | |
|---|---|---|---|
| 7,016,425 B1* | 3/2006 | Kraiem | 375/261 |
| 7,317,702 B2* | 1/2008 | Dominique et al. | 370/328 |
| 7,397,839 B2* | 7/2008 | Maeda et al. | 375/141 |
| 7,609,782 B2* | 10/2009 | Giannakis et al. | 375/299 |
| 7,746,938 B2* | 6/2010 | Hasegawa et al. | 375/260 |
| 2003/0235255 A1* | 12/2003 | Ketchum et al. | 375/285 |
| 2004/0001429 A1* | 1/2004 | Ma et al. | 370/210 |
| 2004/0110525 A1* | 6/2004 | Black et al. | 455/522 |
| 2004/0156386 A1* | 8/2004 | Atarashi et al. | 370/441 |
| 2004/0190440 A1* | 9/2004 | Kim et al. | 370/210 |
| 2004/0190507 A1* | 9/2004 | Wu et al. | 370/389 |
| 2004/0192218 A1* | 9/2004 | Oprea | 455/73 |
| 2005/0030964 A1 | 2/2005 | Tiedemann, Jr. et al. | |
| 2005/0128936 A1* | 6/2005 | Shao | 370/208 |
| 2005/0157670 A1* | 7/2005 | Tang et al. | 370/320 |
| 2005/0159115 A1* | 7/2005 | Sandhu | 455/101 |
| 2005/0185725 A1* | 8/2005 | Maeda et al. | 375/260 |
| 2006/0007850 A1* | 1/2006 | Park et al. | 370/209 |
| 2006/0045001 A1* | 3/2006 | Jalali | 370/208 |
| 2006/0050624 A1* | 3/2006 | Akita | 370/208 |
| 2006/0215603 A1 | 9/2006 | Nishio et al. | |
| 2006/0227888 A1* | 10/2006 | Khan | 375/260 |
| 2006/0246937 A1* | 11/2006 | Lindoff | 455/522 |
| 2006/0268883 A1* | 11/2006 | Qian et al. | 370/394 |
| 2006/0291389 A1* | 12/2006 | Attar et al. | 370/230 |

FOREIGN PATENT DOCUMENTS

| | | |
|---|---|---|
| JP | 2004-512713 A | 4/2004 |
| JP | 2004-236065 | 8/2004 |
| JP | 2004-247902 A | 9/2004 |
| JP | 2004-320679 | 11/2004 |
| JP | 2005-253086 A | 9/2005 |
| JP | 2007-511183 A | 4/2007 |
| JP | 2007-151059 A | 6/2007 |
| JP | 2008-533828 A | 8/2008 |
| RU | 2 248 105 | 3/2005 |
| WO | 02/05506 A2 | 1/2002 |
| WO | WO02/47304 | 6/2002 |
| WO | WO 03/019837 A1 | 3/2003 |
| WO | WO 03/061170 A1 | 7/2003 |
| WO | WO2003/065635 | 8/2003 |
| WO | 2004/002047 A1 | 12/2003 |
| WO | WO 03/010986 | 12/2003 |
| WO | 2004/091126 A1 | 10/2004 |
| WO | WO2004/114572 | 12/2004 |
| WO | WO 2005/013530 | 2/2005 |
| WO | WO2005/020464 | 3/2005 |
| WO | WO 2005/025101 A1 | 3/2005 |
| WO | 2006/130742 A1 | 12/2006 |

OTHER PUBLICATIONS

Samsung Electronics Co. Ltd., "Uplink Multiple Access and Multiplexing for Evolved UTRA", R1-050439, 3GPP TSG RAN WG1 Meeting #41, Athens, Greece, May 9-13, 2005.

Dirk Galda and Hermann Rohling, "A low complexity transmitter structure for OFDM-FDMA uplink systems" - XP010622113, pp. 1737-1741, May 6, 2002.

* cited by examiner

METHOD, APPARATUS, AND SYSTEM FOR TRANSMITTING AND RECEIVING INFORMATION OF AN UNCODED CHANNEL IN AN ORTHOGONAL FREQUENCY DIVISION MULTIPLEXING SYSTEM

CROSS-REFERENCE TO RELATED APPLICATIONS

This application claims priority under 35 U.S.C. §119 to application Serial No. 2005-37777 filed in the Korean Intellectual Property Office on May 4, 2005, the entire disclosure of which is hereby incorporated by reference.

BACKGROUND OF THE INVENTION

1. Field of the Invention

The present invention generally relates to a method and apparatus for transmitting and receiving data in a wireless communication system based on Orthogonal Frequency Division Multiplexing (OFDM). More particularly, the present invention relates to a method and apparatus for efficiently transmitting and receiving channel data for which a coding process is not required.

2. Description of the Related Art

Recently, a large amount of research is being conducted on an Orthogonal Frequency Division Multiplexing (OFDM) transmission method serving as a scheme useful for high-speed data transmission using a radio channel in a mobile communication system. The OFDM scheme is a type of Multi-Carrier Modulation (MCM) scheme for converting a serially input symbol stream in parallel and then modulating and transmitting parallel signals through a plurality of orthogonal subcarriers, in other words a plurality of subcarrier channels. The OFDM transmission scheme copies a second half part of an OFDM symbol, attaches the copied part as a Cyclic Prefix (CP) before the OFDM symbol, and transmits the OFDM symbol, thereby removing InterSymbol Interference (ISI) from a previous symbol. The OFDM transmission scheme, robust to a multipath fading channel, is suitable for broadband high-speed communication.

Figure 1:
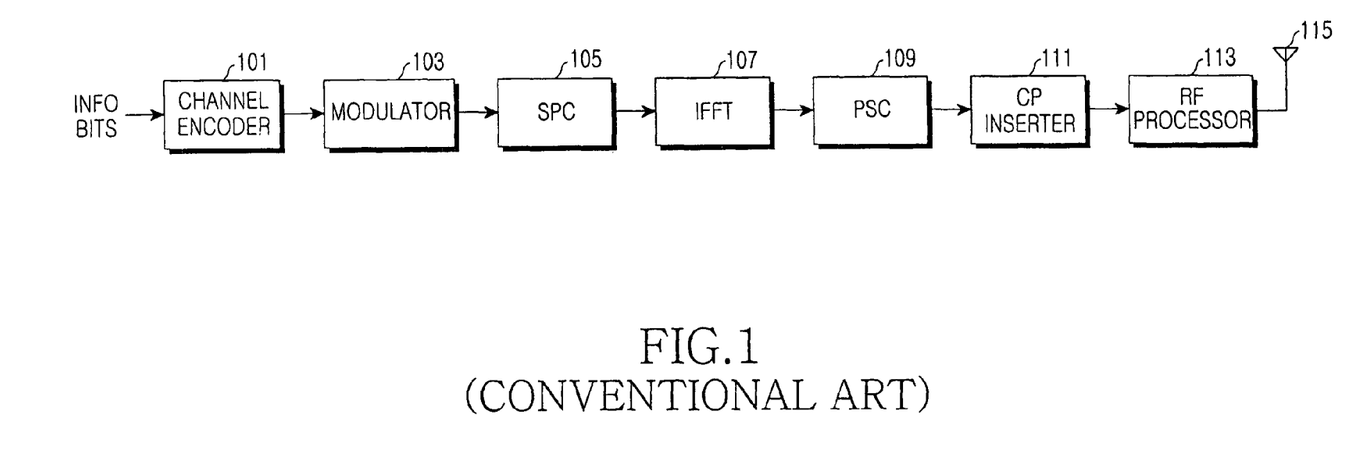
FIG. 1 is a block diagram illustrating a structure of a conventional transmitter in a wireless communication system based on Orthogonal Frequency Division Multiplexing (OFDM)

FIG. 1 is a block diagram illustrating a structure of a conventional transmitter in a wireless communication system based on OFDM.

Referring to FIG. 1, a channel encoder 101 receives a predetermined information bit stream and then performs a channel coding process for the received information bit stream. Conventionally, the channel encoder 101 can use a convolutional encoder, a turbo encoder, a Low Density Parity Check (LDPC) encoder, and so on. The encoded information bit stream from the channel encoder 101 is input to a modulator 103. The modulator 103 modulates the encoded information bit stream in a predefined modulation scheme such as Quadrature Phase Shift Keying (QPSK), 8-Phase Shift Keying (8PSK), 16-Quadrature Amplitude Modulation (16QAM), and so on. It is obvious that a rate matcher (not illustrated) for performing repetition and puncturing functions and so on may be additionally inserted between the channel encoder 101 and the modulator 103.

A Serial to Parallel Converter (SPC) converts an output signal of the modulator 103 to parallel signals, and then inputs the parallel signals to an Inverse Fast Fourier Transform (IFFT) processor 107. The IFFT processor 107 transforms the parallel signals according to an IFFT. A Parallel to Serial Converter (PSC) 109 converts the transformed parallel signals to a serial signal. A CP inserter 111 inserts a CP for preventing interference into the serial signal (or symbol), and then outputs the symbol with the CP. An OFDM symbol stream into which the CP has been inserted is transmitted to a wireless network through a Radio Frequency (RF) processor 113 and an antenna 115.

When the above-described conventional OFDM transmitter performs a transmission operation, a modified multiplexing scheme performs a Hadamard transform on modulated symbols to be transmitted from the OFDM transmitter in a frequency domain and transmits the transformed symbols without directly transmitting one modulated symbol through one subcarrier. This scheme is referred to as Multi-Carrier Code Division Multiplexing (MC-CDM) or Orthogonal Frequency Code Division Multiplexing (OFCDM). Hereinafter, MC-CDM and OFCDM are referred to as the OFCDM scheme.

Figure 2:
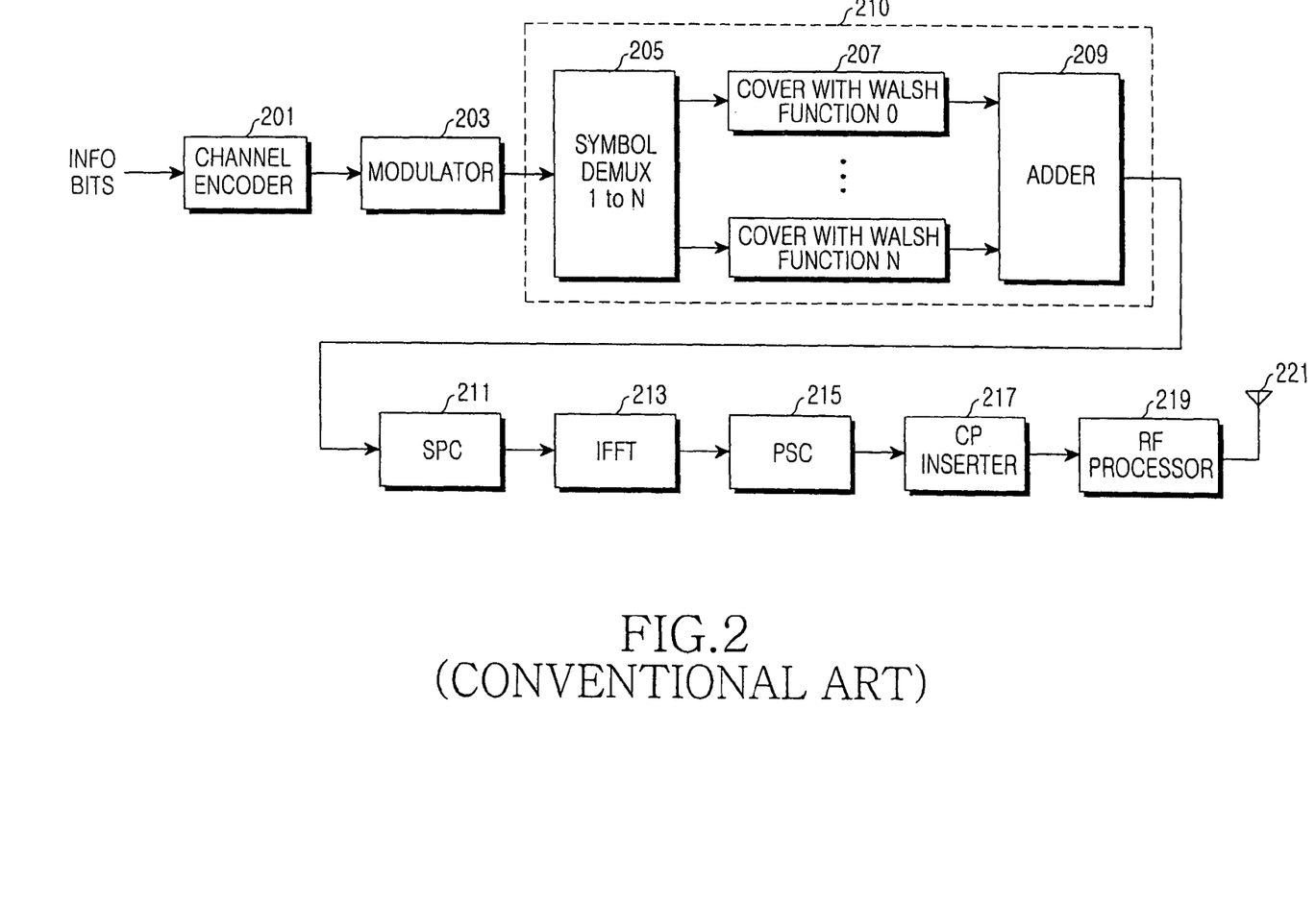
FIG. 2 is a block diagram illustrating a structure of a conventional Orthogonal Frequency Code Division Multiplexing (OFCDM) transmitter in the wireless communication system based on OFDM.

FIG. 2 is a block diagram illustrating a structure of a conventional OFCDM transmitter in the wireless communication system based on OFDM. The OFCDM transmitter of FIG. 2 is configured by adding a well-known Hadamard transform processor 210 to the OFDM transmitter of FIG. 1 such that a CDM transmission scheme is applied to the OFDM transmission scheme.

Referring to FIG. 2, a channel encoder 201 receives a predetermined information bit stream and performs a conventional channel coding process such as convolutional coding, turbo coding, Low Density Parity Check (LDPC) coding, and so on. The encoded information bit stream from the channel encoder 201 is input to a modulator 203. The modulator 203 modulates the encoded information bit stream in a predefined modulation scheme. A Demultiplexer (DEMUX) 205 of the Hadamard transform processor 210 demultiplexes the modulated signal (or symbol stream) into N outputs. A plurality of covers with Walsh functions, in other words Walsh covers 0~N, 207 cover the N output signals with predefined Walsh codes. An adder 209 computes a sum of the signals covered with the Walsh codes, and outputs the signal sum to an SPC 211. An output of the SPC 211 is transmitted to a wireless network through an IFFT processor 213, a PSC 215, a CP inserter 217, an RF processor 219, and an antenna 221.

Figure 3:
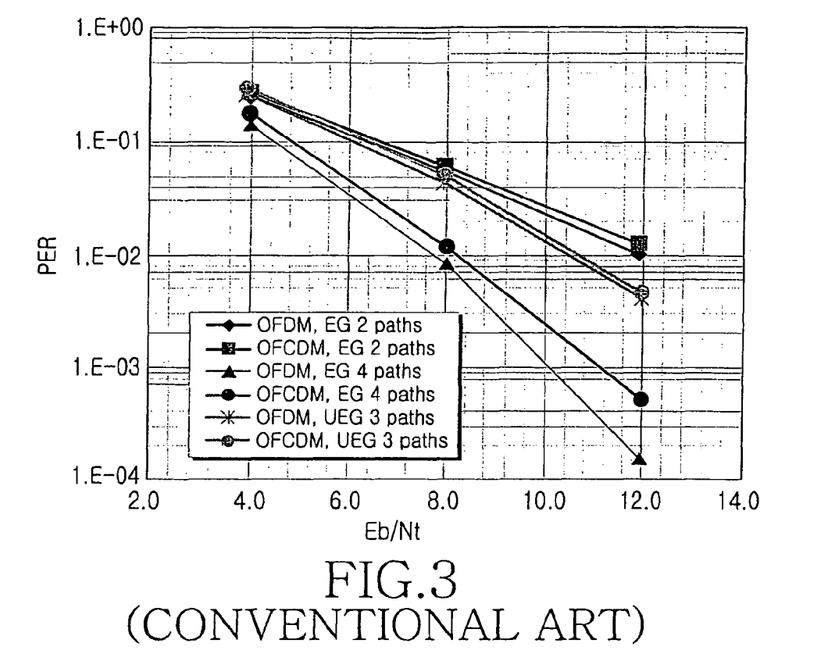
FIGS. 3 to 5 illustrate simulation results of a performance comparison between the OFDM and OFCDM schemes.
Figure 4:
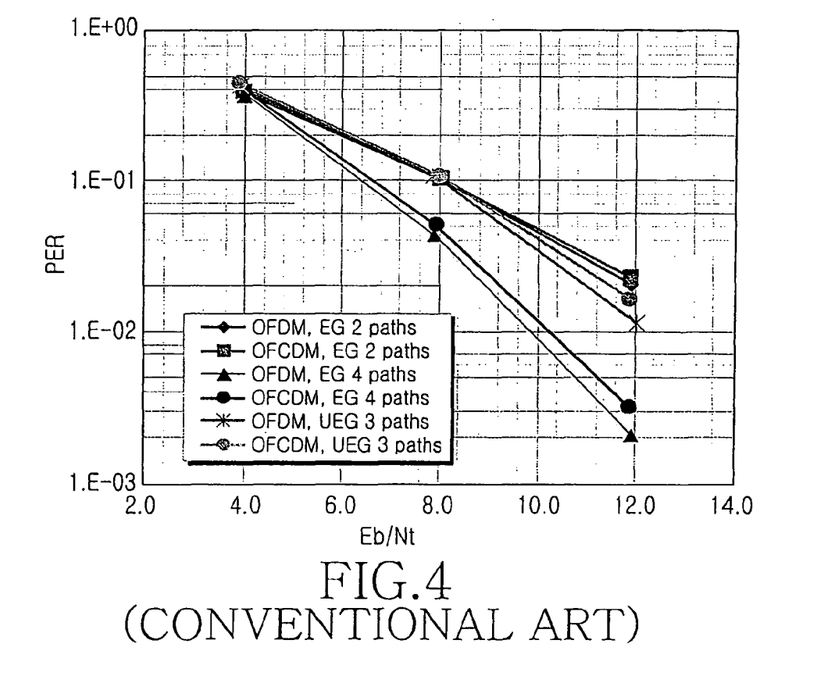
Figure 5:
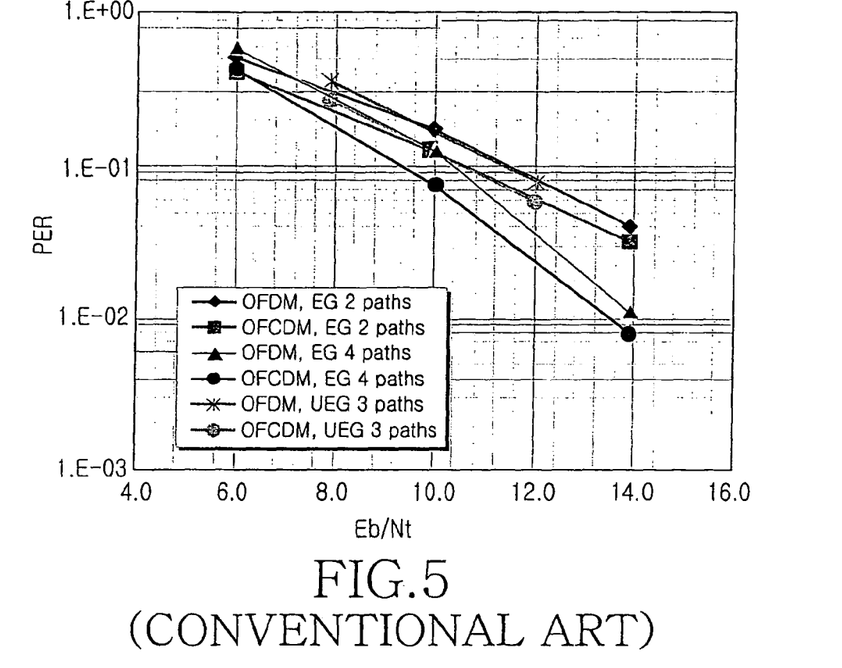

In the above-mentioned two multiplexing transmission techniques, in other words the OFDM and OFCDM schemes, one scheme does not always outperform the other scheme. Relative performances of the OFDM and OFCDM schemes can differ according to many factors. The main factors capable of varying the performances of the OFDM and OFCDM schemes are the code rate of transmitted data, channel frequency selectivity, and so on. As described above, simulation results of a performance comparison between the OFDM and OFCDM schemes according to a code rate, channel frequency selectivity, and so on are illustrated in FIGS. 3 to 5. In FIGS. 3 to 5, the horizontal axis represents a signal to noise ratio (Eb/Nt) when transmitted data is received, the vertical axis represents a Packet Error Rate (PER), EG represents equal gain paths, and UEG represents unequal gain paths.

FIGS. 3 to 5 illustrate results of a performance comparison between the OFDM and OFCDM schemes, for example, when code rates of transmitted data are 1/4, 1/2, and 4/5, respectively. It can be seen that the OFDM scheme outperforms an OFCDM (or MC-CDM) scheme when the code rates of transmitted data are low (1/4 and 1/2) as illustrated in FIGS. 3 and 4. Moreover, it can be seen that a performance differs according to the number of equal/unequal gain paths even when frequency selectivity is varied. As illustrated in FIG. 5, it can be seen that the OFCDM scheme outperforms the OFDM scheme when the code rate of transmitted data is high (4/5).

Because performance differs according to a code rate or coding of a transmitted channel in the wireless communication system based on OFDM, there exists a need for a method apparatus, and system for efficiently transmitting data while considering this difference.

SUMMARY OF THE INVENTION

It is, therefore, an exemplary object of the present invention to provide a method, apparatus, and system for transmitting and receiving uncoded information in an Orthogonal Frequency Division Multiplexing (OFDM) system for transmitting various control information using a radio channel.

It is another exemplary object of the present invention to provide a method, apparatus, and system for transmitting and receiving 1-bit information in an Orthogonal Frequency Division Multiplexing (OFDM) system for transmitting various control information using a radio channel.

It is another exemplary object of the present invention to provide a transmission/reception method, apparatus, and system that can improve diversity gain when 1-bit information is transmitted to a plurality of users in an Orthogonal Frequency Division Multiplexing (OFDM) system for transmitting various control information using a radio channel.

It is yet another exemplary object of the present invention to provide a method, apparatus, and system for transmitting and receiving uncoded control information in an Orthogonal Frequency Division Multiplexing (OFDM) system in which various control information is transmitted using a radio channel and a multiplexing scheme differs according to a channel type.

In accordance with an exemplary aspect of the present invention, there is provided a method for transmitting information of an uncoded channel from a base station in an Orthogonal Frequency Division Multiplexing (OFDM) system, comprising the steps of performing a unitary transform on the uncoded channel information, mapping subcarriers in a pattern for increasing diversity gain of the uncoded channel information on which the unitary transform has been performed, and multiplexing and transmitting other channel information with the uncoded channel information mapped to the subcarriers.

In accordance with another exemplary aspect of the present invention, there is provided an apparatus for transmitting information of an uncoded channel in a base station of an Orthogonal Frequency Division Multiplexing (OFDM) system, comprising, a unitary transform processor for performing a unitary transform on the uncoded channel information, a subcarrier mapper for mapping subcarriers in a pattern for increasing diversity gain of the uncoded channel information on which the unitary transform has been performed, a multiplexer for multiplexing and transmitting other channel information with the uncoded channel information mapped to the subcarriers and a controller for controlling an operation of the subcarrier mapper.

In accordance with another exemplary aspect of the present invention, there is provided a method for receiving information of an uncoded channel in a terminal of an Orthogonal Frequency Division Multiplexing (OFDM) system, comprising the steps of: receiving the uncoded channel information from a radio channel and performing an inverse unitary transform on the received uncoded channel information.

In accordance with another exemplary aspect of the present invention, there is provided an apparatus for receiving information of an uncoded channel in a terminal of an Orthogonal Frequency Division Multiplexing (OFDM) system, comprising a reception module for receiving the uncoded channel information from a radio channel, an inverse unitary transform processor for performing an inverse unitary transform on the received uncoded channel information and a controller for controlling an operation of the inverse unitary transform processor.

In accordance with yet another exemplary aspect of the present invention, there is provided an Orthogonal Frequency Division Multiplexing (OFDM) system for transmitting and receiving information of an uncoded channel, comprising a transmitter for performing a unitary transform on the uncoded channel information, mapping subcarriers in a pattern for increasing diversity gain of the uncoded channel information on which the unitary transform has been performed, and multiplexing and transmitting other channel information with the uncoded channel information mapped to the subcarriers, and a receiver for demultiplexing the uncoded channel information received from a radio channel to a designated reception path, and performing an inverse unitary transform on the uncoded channel information.

BRIEF DESCRIPTION OF THE DRAWINGS

The above and other objects and aspects of the present invention will be more clearly understood from the following detailed description taken in conjunction with the accompanying drawings, in which.

DETAILED DESCRIPTION OF THE EXEMPLARY EMBODIMENTS

Exemplary embodiments of the present invention will be described in detail herein below with reference to the accompanying drawings. In the following description, detailed descriptions of functions and configurations incorporated herein that are well known to those skilled in the art are omitted for clarity and conciseness.

Before exemplary embodiments of the present invention are described, an exemplary concept of the present invention will be briefly described.

When different types of channels, for example, a packet data channel, a common control channel, and a control channel designated for a particular user, are configured in a wireless communication system, reception performance may be degraded according to a transmission scheme if only a particular multiplexing scheme is used. This reception performance degradation may occur when information of at least one bit is transmitted in a channel for transmitting Acknowledgement/Non-acknowledgement (ACK/NACK) information to a particular user and a channel for transmitting a power control bit or when uncoded information is transmitted. Conventionally, 1-bit control information is transmitted as the uncoded information.

Figure 6:
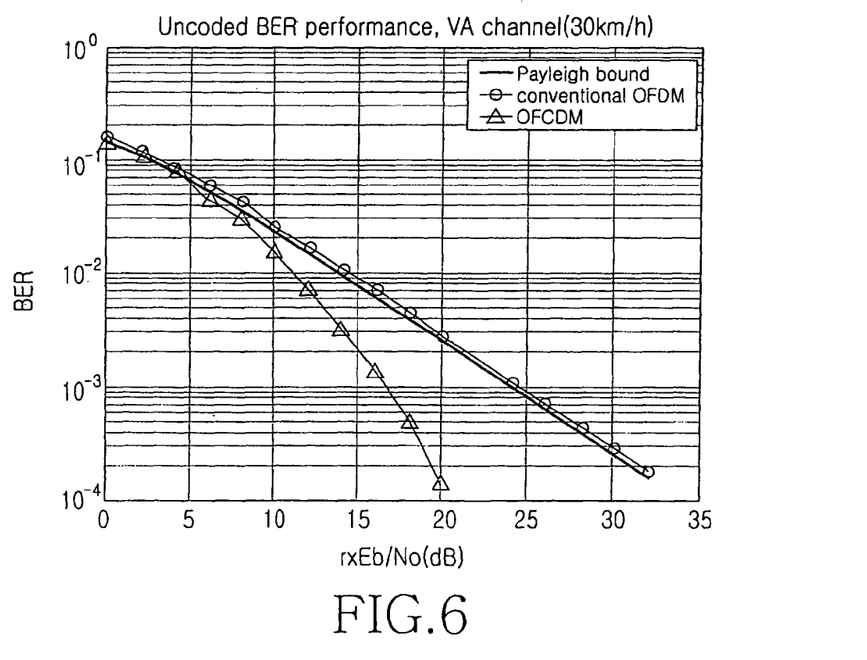
FIG. 6 illustrates simulation results of reception reliability when uncoded 1-bit information is transmitted to a particular user in the wireless communication system based on the OFDM or OFCDM scheme.

That is, FIG. 6 illustrates simulation results of reception reliability when uncoded 1-bit information is transmitted to a particular user in a wireless communication system using an Orthogonal Frequency Division Multiplexing (OFDM) or Orthogonal Frequency Code Division Multiplexing (OFCDM) scheme. In the simulation results of FIGS. 3 to 5, it can be seen that the relative reception performance superiority between the OFDM and OFCDM schemes differs according to a code rate. Moreover, it can be seen that the performance of the OFCDM scheme is superior when a code rate of a transmission packet is high in a data channel and the performance of the OFDM scheme is superior when a code rate of a transmission packet is low in the data channel. Moreover, it can be seen that the reception performance of the OFCDM scheme is superior when uncoded 1-bit information is transmitted at an uncoded Bit Error Rate (BER) as illustrated in FIG. 6.

Exemplary embodiments of the present invention propose technology for transmitting and receiving information by broadly dispersing 1-bit information to be transmitted to a plurality of users in frequency and time domains using a unitary transform technique such as a Hadamard transform or Fast Fourier Transform (FFT) such that diversity gain can be maximized when the 1-bit information and/or uncoded information are transmitted to a particular user.

For convenience, an ACK channel corresponding to a channel for transmitting uncoded 1-bit information in accordance with an exemplary embodiment of the present invention will be described in detail. One of ordinary skill in the art will appreciate that the transmission/reception method and apparatus of the present invention described below can be applied to other channels for transmitting 1 bit to a particular user that are similar to the ACK channel or an uncoded channel (for example, a channel for transmitting a power control bit).

Figure 7:
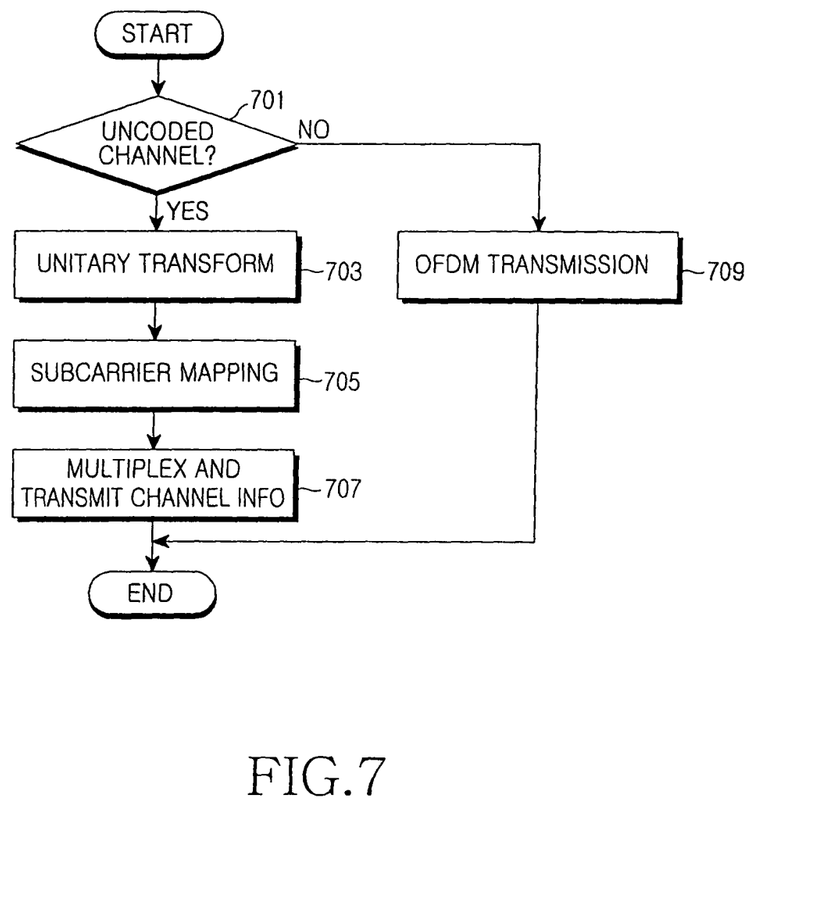
FIG. 7 is a flowchart illustrating a method for transmitting uncoded information in an OFDM system in accordance with an exemplary embodiment of the present invention.

FIG. 7 is a flowchart illustrating a method for transmitting uncoded information in an OFDM system in accordance with an exemplary embodiment of the present invention.

Using the transmission method of an exemplary embodiment of the present invention, a base station determines whether an associated channel is a coded channel or an uncoded channel when information of each channel is transmitted in step 701. If the associated channel is an uncoded channel such as an ACK channel as a result of the determination in step 701, the base station performs a unitary transform on information of 1-bits to be transmitted to a plurality of users using a Hadamard transform or FFT technique in step 703. After the information of 1-bits on which the unitary transform has been performed is mapped to subcarriers such that the maximum diversity gain can be obtained in step 705, they are multiplexed with other channel information and are dispersed in the time and frequency domains in step 707. On the other hand, if it is determined in step 701 that the associated channel is the coded channel, information of the associated channel is transmitted in the OFDM scheme using the transmitter structure as illustrated in FIG. 1. Information to be transmitted in the OFDM scheme may be information of a control channel carrying control information to be commonly transmitted to the users or information of a data channel with characteristics different from those of the ACK channel.

Figure 13:
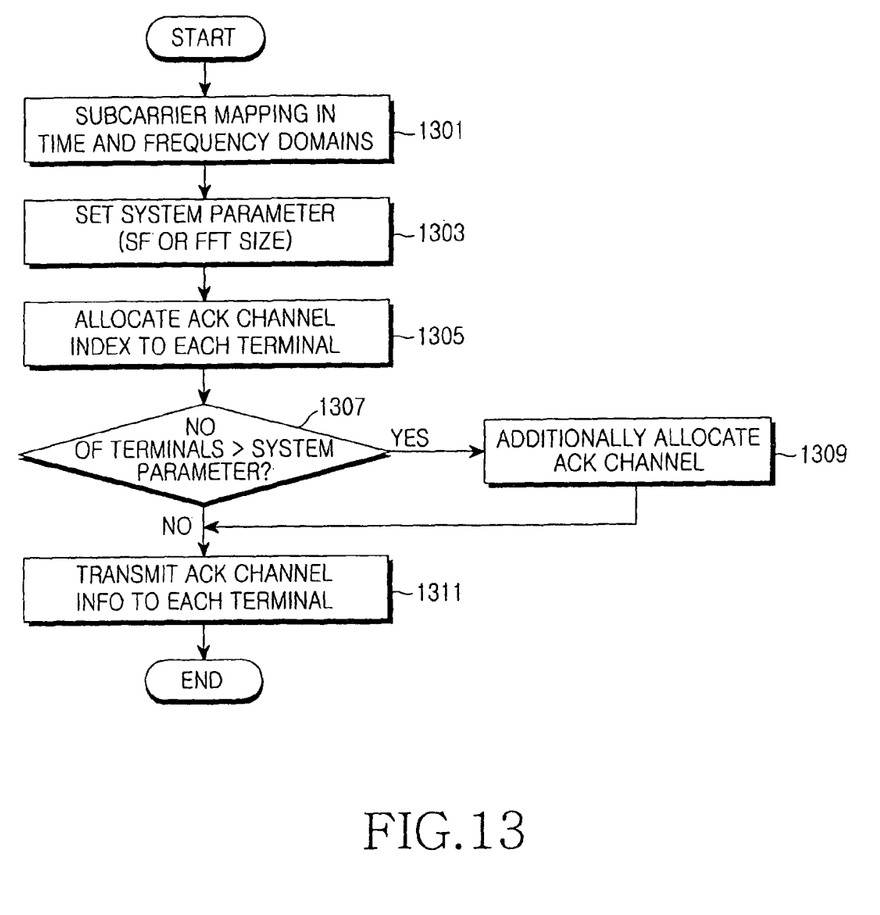
FIG. 13 is a flowchart illustrating a channel allocation process and a system parameter setting process when uncoded information is transmitted in the OFDM system in accordance with an exemplary embodiment of the present invention.

FIG. 13 is a flowchart illustrating a channel allocation process and a system parameter setting process when uncoded information is transmitted in the OFDM system in accordance with an exemplary embodiment of the present invention. As an example of the uncoded information, an ACK/NACK bit will be described.

In step 1301 of FIG. 13, a base station controls a subcarrier mapper within a transmitter described below such that one ACK channel is mapped to subcarriers within one transmission unit in the time and frequency domains. In step 1303, the base station sets a system parameter of the ACK channel according to a type of a used unitary transform processor. For example, when a Hadamard transform processor is used as the unitary transform processor, a spreading factor (SF_ACKCH) is set as the system parameter. When an FFT processor is used, an FFT size is set as the system parameter. Subsequently, the base station allocates an ACK channel index for each terminal at a call setup time in step 1305. At this time, when the Hadamard transform processor is used as the unitary transform processor, a Walsh code index is allocated to each terminal. When the FFT processor is used as the unitary transform processor, an FFT input position for each terminal is allocated.

Subsequently, the base station determines whether the number of terminals located within an associated region exceeds a system parameter value in step 1307. If the number of terminals exceeds the spreading factor or the FFT size, the base station proceeds to step 1309 to additionally allocate an ACK channel. Herein, the additional ACK channel allocation is performed whenever the number of terminals exceeds the system parameter value. For example, when the spreading factor (SF_ACKCH) is 16, the number of terminals for which one channel can be supported is 16. If the number of terminals is more than 16, it means that another ACK channel is to be allocated. In step 1311, the base station transmits an ACK/NACK bit to each terminal through the ACK channel allocated as described above.

Figure 8:
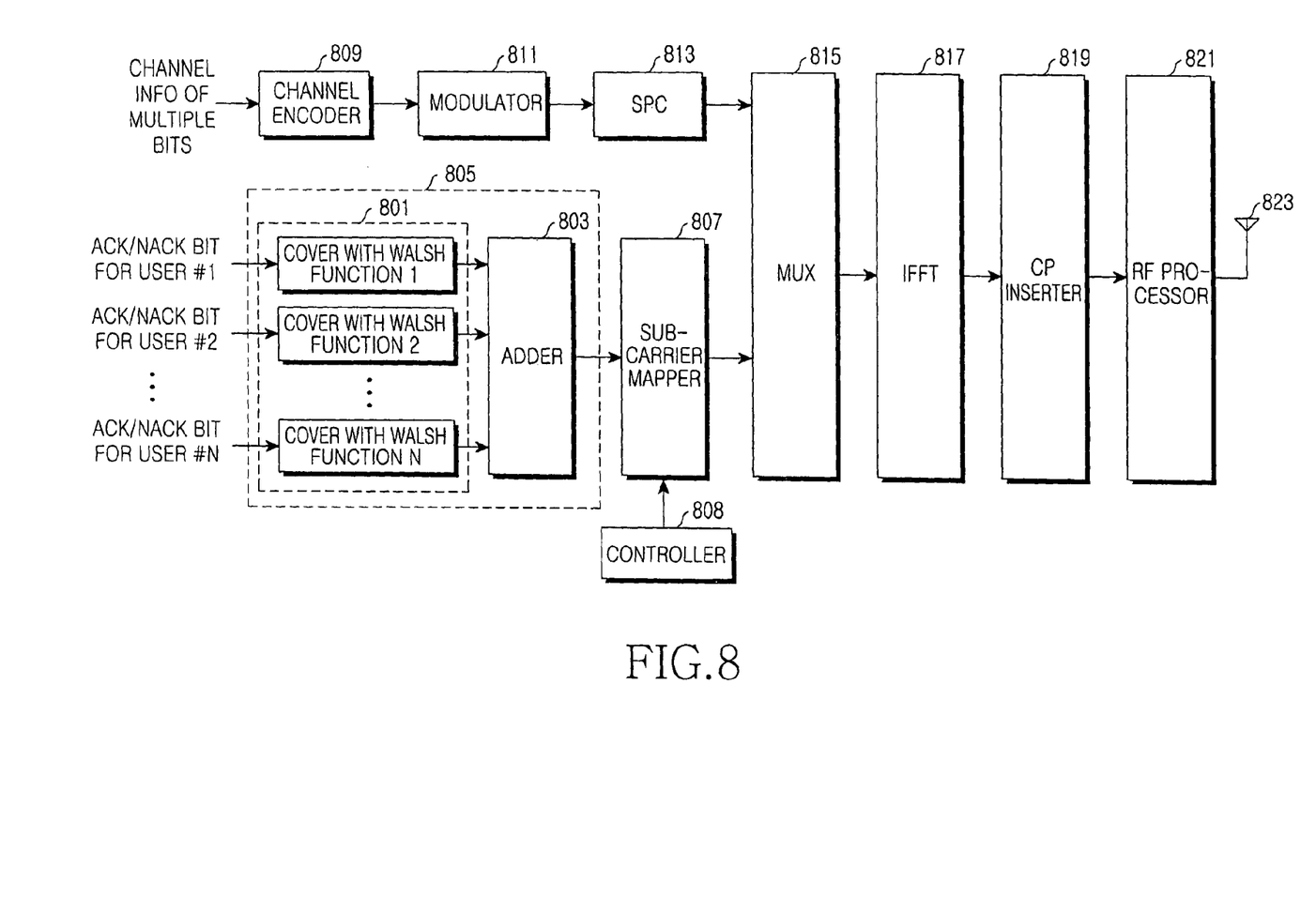
FIG. 8 is a block diagram illustrating a structure of an apparatus for transmitting uncoded information in the OFDM system in accordance with an exemplary embodiment of the present invention.

FIG. 8 is a block diagram illustrating a structure of an apparatus for transmitting uncoded information in the OFDM system in accordance with an exemplary embodiment of the present invention. This apparatus is provided in a base station or the like.

In FIG. 8, Walsh covers 801 receive ACK/NACK bits to be transmitted to multiple users #1~#N and cover (or spread) the received ACK/NACK bits with Walsh codes (or Walsh functions) allocated thereto. The Walsh codes (or Walsh functions) may use codes agreed to between the base station and user terminals using L3 signaling or the like. An adder 803 computes a sum of the ACK/NACK bits covered with the Walsh codes, and inputs the ACK/NACK bit sum to a subcarrier mapper 807. The Walsh covers 801 and the adder 803 configure a Hadamard transform processor 805 for performing a unitary transform.

Figure 10A:
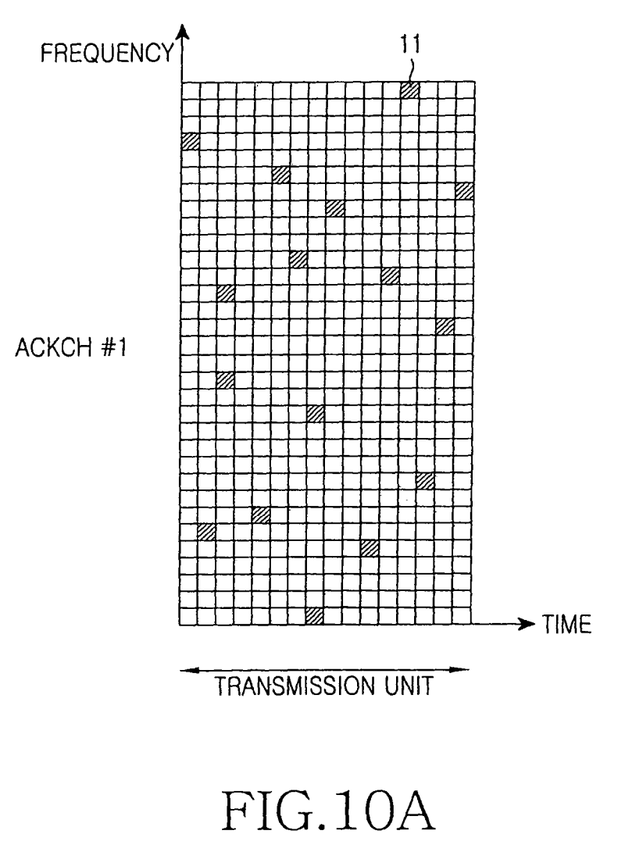
FIGS. 10A and 10B illustrate an example of mapped subcarriers in accordance with an exemplary embodiment of the present invention.

Under control of a controller 808, the subcarrier mapper 807 maps the ACK/NACK bits to subcarriers such that the maximum diversity gain can be obtained. For example, the subcarrier mapper 807 performs the mapping process such that the subcarriers are dispersed on the time and frequency axes as illustrated in FIG. 10A. The controller 808 controls the system parameter setting process and the channel allocation process for an ACK/NACK bit transmission as described with reference to FIG. 13.

FIG. 10A illustrates an example of the mapped subcarriers 11 in shaded regions. The subcarriers mapped as illustrated in FIG. 10A are dispersed to transmit the ACK/NACK bits such that the maximum diversity gain can be obtained on the time and frequency axes. It is to be noted that the subcarrier mapper 807 operates in a unit of multiple OFDM symbols rather than one OFDM symbol. In one example, a pattern of one ACKCH #1 illustrated in FIG. 10A, in other words frequency and time positions of subcarriers in one transmission unit, can be predefined through the ACK channel index as described with reference to FIG. 13 and can be agreed between the base station and the terminals. In the event that the subcarrier allocation pattern configures one ACK channel as illustrated in FIG. 10A, a different subcarrier allocation pattern for an additionally allocated ACK channel is distinguished and indicated by the ACK channel index as described with reference to FIG. 13.

A Multiplexer (MUX) 815 multiplexes an output of the subcarrier mapper 807 with information of other control channels and then outputs a multiplexing result. Herein, the other control channels are control channels with characteristics different from those of the ACK channel, for example uncoded channels or coded channels for transmitting control information of multiple bits rather than one bit. A transmission of the other control channels conforms to the OFDM transmission scheme as described with reference to FIG. 1. A channel encoder 809, a modulator 811, and an SPC 813 of FIG. 8 are used to transmit the other control channel information.

That is, the channel encoder 809 encodes the other control channel information (or channel information of multiple bits). The modulator 811 modulates the encoded information. The SPC 813 converts the modulated information to parallel signals. The parallel signals are multiplexed along with an output of the subcarrier mapper 807. A multiplexing result is input to an Inverse Fast Fourier Transform (IFFT) processor 817. IFFT signals are converted to a serial signal in a PSC (not illustrated). A CP inserter 819 inserts a CP for preventing interference into the serial signal, and transmits the signal into which the CP has been inserted to a wireless network through an RF processor 821 and an antenna 823.

Figure 9:
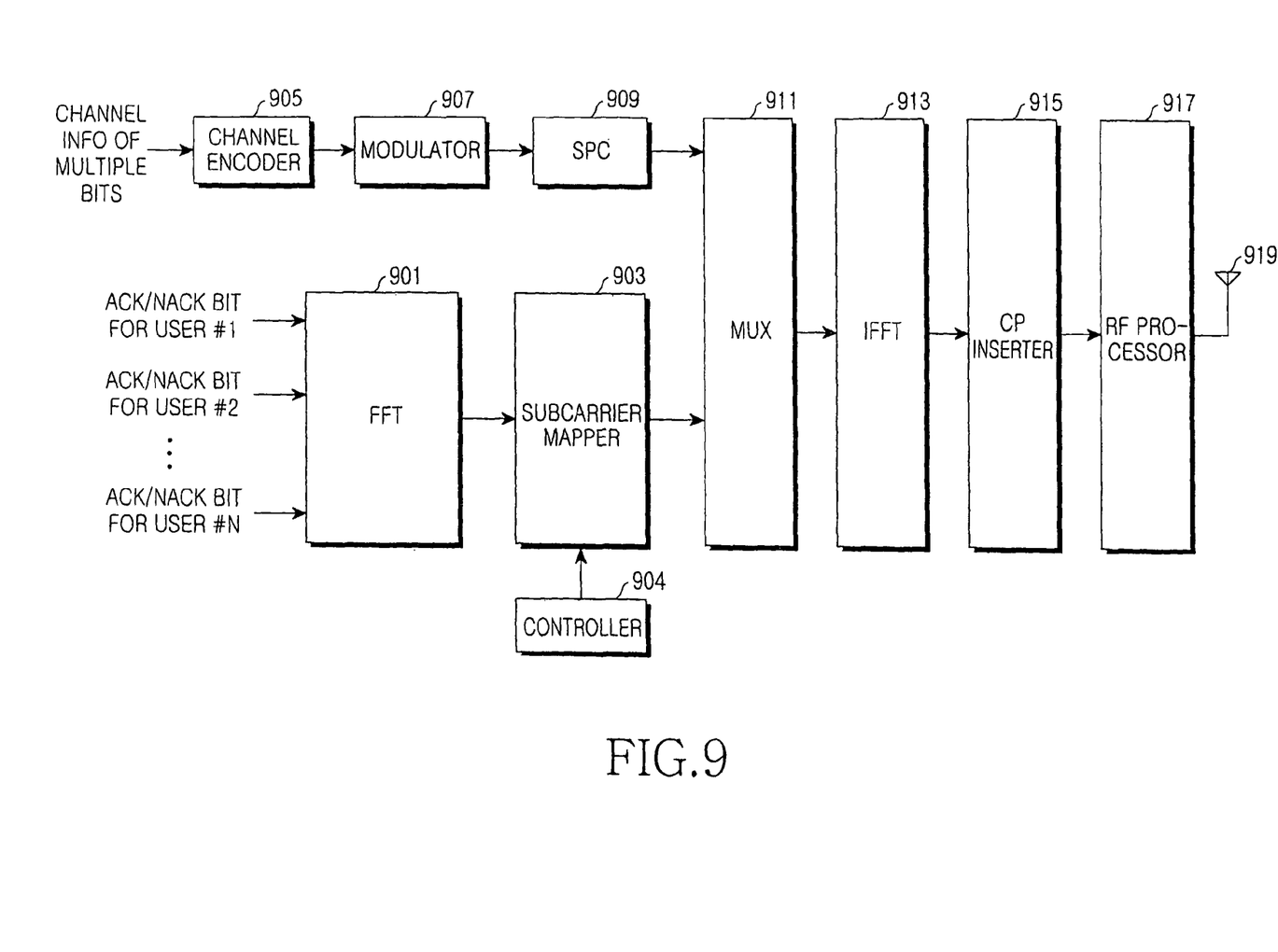
FIG. 9 is a block diagram illustrating a structure of an apparatus for transmitting uncoded information in the OFDM system in accordance with another exemplary embodiment of the present invention.

FIG. 9 is a block diagram illustrating a structure of an apparatus for transmitting uncoded information in the OFDM system in accordance with another exemplary embodiment of the present invention. This apparatus is provided in a base station and the like. Because the remaining components 903~919 except an FFT processor 901 in the structure of FIG. 9 perform the same operations as those of FIG. 8, their description is omitted.

The exemplary embodiment of FIG. 9 uses the FFT processor 901 in the place of the Hadamard transform processor 805 of FIG. 8 for performing the unitary transform. Accordingly, ACK/MACK bits of multiple users #1~#N on which the unitary transform has been performed through the FFT processor 901 are mapped to subcarriers. The MUX 911 multiplexes the ACK/NACK bits with information of other control channels for transferring channel information of multiple bits, such that the channel information is transmitted to a wireless network.

The exemplary embodiments of FIGS. 8 and 9 use the unitary transform processors such as the Hadamard transform processor 805 and the FFT processor 901. Also, there can be used transform processors with quasi-unitary characteristics, in other words transform processors in which multiple sets are provided, elements of the same set are orthogonal to each other, and cross talk is minimized between elements of different sets.

Figure 10B:
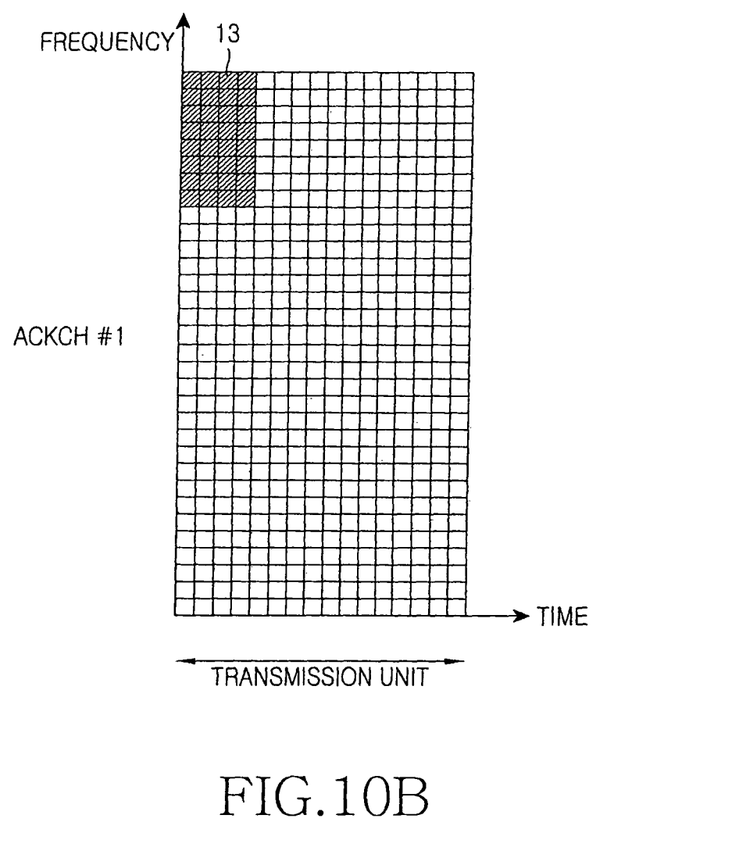

In the exemplary embodiments of FIGS. 8 and 9, the subcarrier mappers 807 and 903 map subcarriers as illustrated in FIG. 10A such that diversity gain of the ACK/NACK bits on which the unitary transform has been performed can be maximized. Also, the subcarriers can be mapped such that high diversity gain is obtained as illustrated in FIG. 10B. It can be useful that a diversity is obtained in a particular subband 13 as illustrated in FIG. 10B when a terminal prefers a particular subband, in other words a base station transmitter knows that a channel state of the particular subband is good and channel states of the remaining subbands are bad.

Next, a receiver of an exemplary embodiment of the present invention will be described with reference to FIGS. 11 and 12. For convenience, an operation for receiving ACK/NACK bits will be described also in an exemplary embodiment of the receiver.

Figure 11:
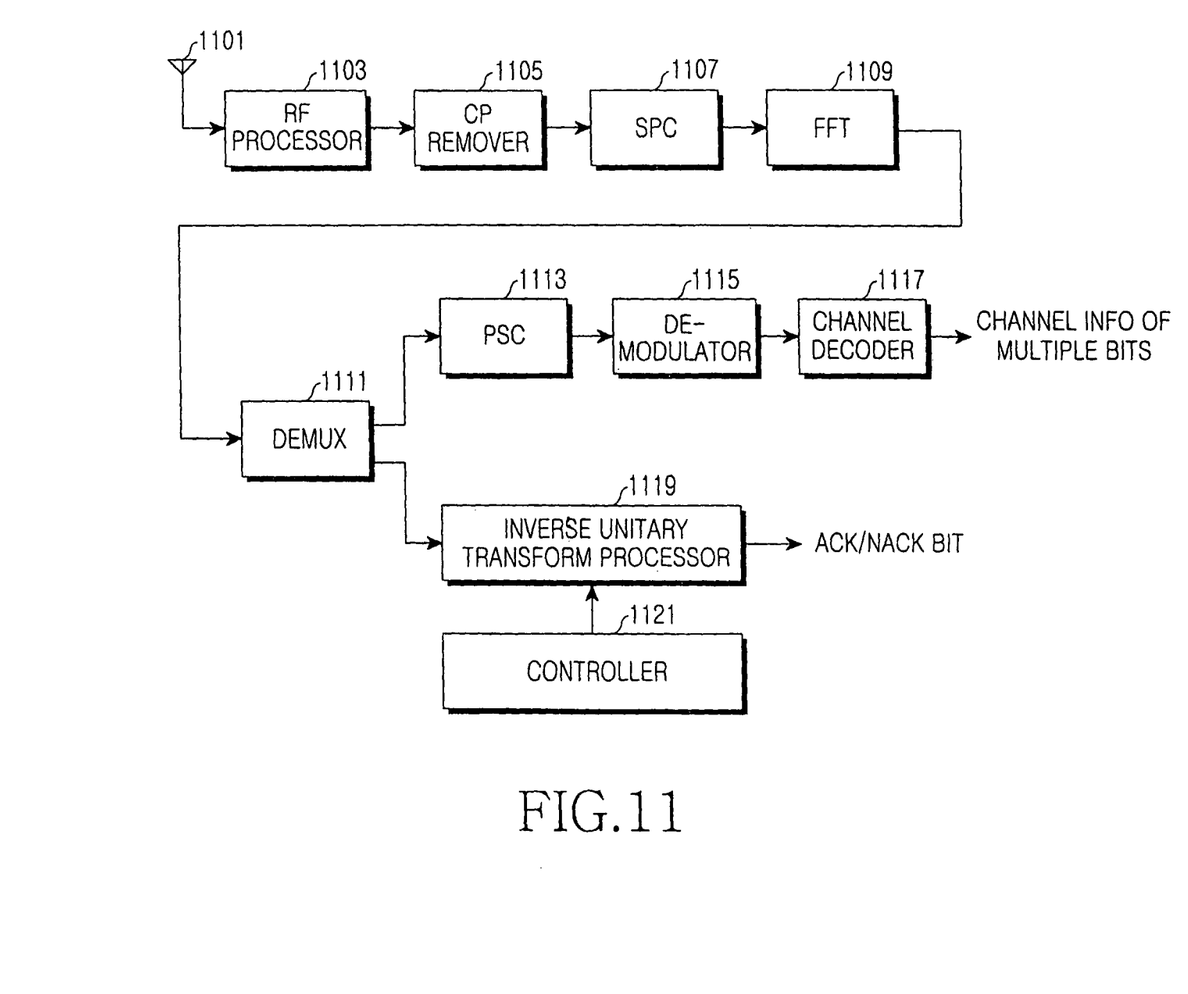
FIG. 11 is a block diagram illustrating a structure of an apparatus for receiving uncoded information in the OFDM system in accordance with an exemplary embodiment of the present invention.

FIG. 11 is a block diagram illustrating a structure of an apparatus for receiving uncoded information in the OFDM system in accordance with an exemplary embodiment of the present invention. This apparatus is provided in a user terminal and so on.

In the receiver structure of FIG. 11, the remaining components 1101~1109 and 1113~1117 except a Demultiplexer (DEMUX) 1111, a unitary transform processor 1119, and a controller 1121 have the same configurations as those of a conventional OFDM receiver. In FIG. 11, an OFDM symbol received through the antenna 1101 and the RF processor 1103 includes ACK/NACK bits. The CP remover 1105 removes a CP from the received OFDM symbol. The SPC 1107 converts a signal from which the CP has been removed to parallel signals. The parallel signals are input to the FFT processor 1109. The DEMUX 1111 demultiplexes an output of the FFT processor 1109 according to a type of received channel, and outputs a demultiplexing result to a predefined path.

For channels for transferring control information of multiple bits, a reception path is set to a first path connected to the PSC 1113. The channels are demodulated and decoded according to the conventional OFDM reception operation. For channels for transferring uncoded 1-bit information such as an ACK/NACK bit, a reception path is set to a second path connected to the unitary transform processor 1119. Under control of the controller 1121, the channels undergo an inverse Hadamard transform or IFFT, such that the ACK/NACK bit and the like are output.

When an inverse Hadamard transform processor is used as the inverse unitary transform processor 1119, it can be implemented with, for example, a component for performing Walsh decovering. In this case, the controller 1121 performs a control operation such that a Walsh decover can operate using a Walsh code allocated to an associated terminal.

Figure 12:
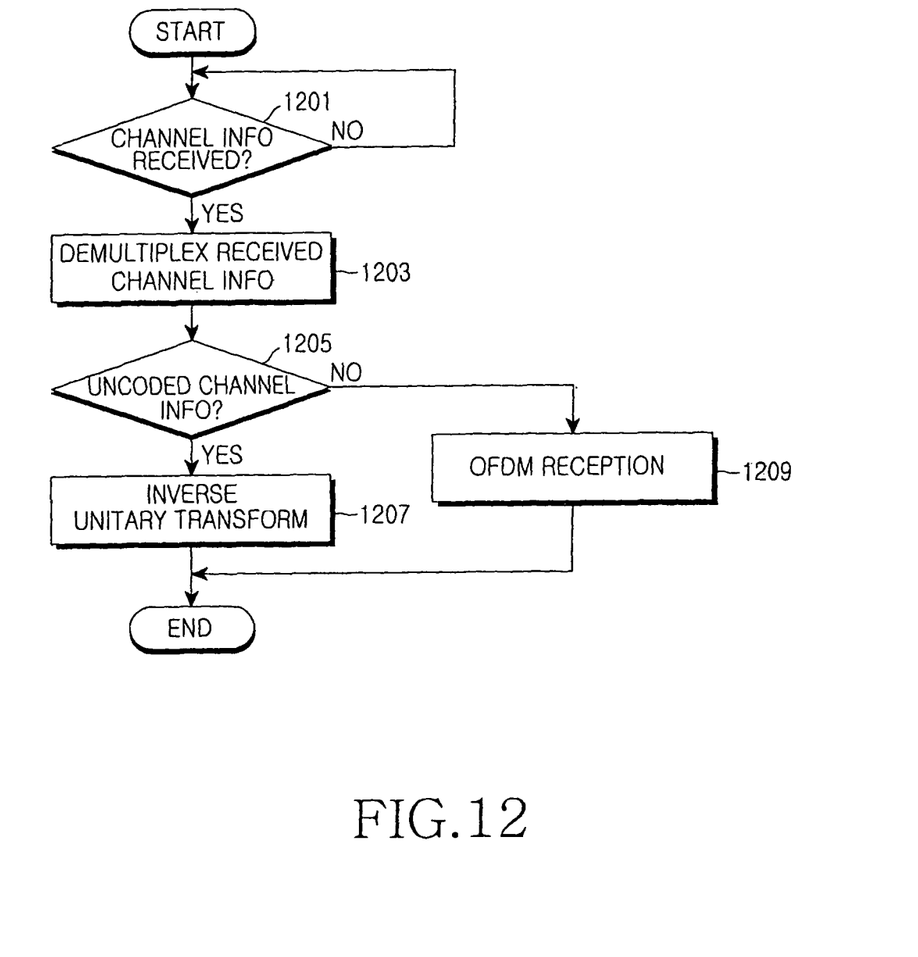
FIG. 12 is a flowchart illustrating a method for receiving uncoded information in accordance with an exemplary embodiment of the present invention.

FIG. 12 is a flowchart illustrating a method for receiving uncoded information in accordance with an exemplary embodiment of the present invention. This method indicates a reception operation of a terminal and so on.

When the terminal receives information of a particular channel through a wireless network in step 1201, the DEMUX 1111 demultiplexes the received channel information to a predefined path according to a type of received channel in step 1203. Upon determining that the received channel is a channel for transmitting uncoded information such as an ACK/NACK bit in step 1205, the terminal performs an inverse unitary transform on the received information and outputs the transformed information in step 1207. Upon determining that the received channel is a coded channel for transmitting multiple bits in step 1205, the terminal processes the received information according to an OFDM reception operation in step 1209.

As is apparent from the above description, exemplary embodiments of the present invention can improve reception reliability of associated channels by providing an efficient transmission/reception method and apparatus when uncoded information or 1-bit information is transmitted to a user through a radio channel in a wireless communication system based on OFDM.

Moreover, exemplary embodiments of the present invention can improve diversity gain when 1-bit control information is transmitted to a plurality of users in an OFDM system.

Although exemplary embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A method for transmitting acknowledgement (ACK) information from a base station in an Orthogonal Frequency Division Multiplexing (OFDM) system, the method comprising:
   spreading the ACK information separately from other control information by applying a sequence from a set of mutually orthogonal sequences;
   mapping the spread ACK information to subcarriers in a pattern for increasing diversity gain of the ACK information;
   encoding the other control information except the ACK information according to a channel encoding scheme without spreading; and
   multiplexing the spread ACK information mapped to the subcarriers with the encoded other control information to transmit the multiplexed information.

2. The method of claim 1, further comprising:
   additionally allocating an ACK channel when a number of terminals within a region of the base station exceeds an allowable range of a system parameter.

3. The method of claim 1, wherein the sequence is a walsh code.

4. The method of claim 1, wherein the ACK information is spread using a spreading factor as a system parameter.

5. The method of claim 4, further comprising:
   additionally allocating an ACK channel when a number of terminals within a region of the base station exceeds an allowable range of the system parameter.

6. The method of claim 1, wherein the mapping of the spread ACK information to the subcarriers comprises mapping the spread ACK information to the subcarriers in a particular subband.

7. The method of claim 1, wherein the other control information comprises coded channel information.

8. The method of claim 1, wherein the spread ACK information is mapped based on an ACK channel index.

9. The method of claim 1, wherein the spread ACK information is mapped to a plurality of OFDM symbols.

10. The method of claim 1, further comprising:
    allocating additional ACK channels based on a system parameter.

11. The method of claim 1, wherein the pattern comprises units of multiple OFDM symbols.

12. An apparatus for transmitting acknowledgement (ACK) information in a base station of an Orthogonal Frequency Division Multiplexing (OFDM) system, the apparatus comprising:
    a processor for spreading the ACK information separately from other control information by applying a sequence from a set of mutually orthogonal sequences;
    a subcarrier mapper for mapping the spread ACK information to subcarriers in a pattern for increasing diversity gain of the ACK information;
    an encoder for encoding the other control information except the ACK information according to a channel encoding scheme without spreading;
    a multiplexer for multiplexing the spread ACK information mapped to the subcarriers with the encoded other control information to transmit the multiplexed information; and
    a controller for controlling an operation of the subcarrier mapper.

13. The apparatus of claim 12, wherein when a number of terminals within a region of the base station exceeds an allowable range of a system parameter, the controller additionally allocates an ACK channel.

14. The apparatus of claim 12, wherein the sequence is a walsh code.

15. The apparatus of claim 12, wherein the ACK information is spread using a spreading factor as a system parameter.

16. The apparatus of claim 15, wherein when a number of terminals within a region of the base station exceeds an allowable range of the system parameter, the controller additionally allocates an ACK channel.

17. The apparatus of claim 12, wherein the other control information comprises coded channel information.

18. The apparatus of claim 12, wherein the spread ACK information is mapped based on an ACK channel index.

19. The apparatus of claim 12, wherein the spread ACK information is mapped to a plurality of OFDM symbols.

20. The apparatus of claim 12, wherein additional ACK channels are allocated based on a system parameter.

21. The apparatus of claim 12, wherein the pattern comprises units of multiple OFDM symbols.

22. A method for receiving acknowledgement (ACK) information in a terminal of an Orthogonal Frequency Division Multiplexing (OFDM) system, wherein the ACK information is spread by applying a sequence from a set of mutually orthogonal sequences prior to transmission of the ACK information, the method comprising:
    receiving and demultiplexing the ACK information and other control information from a radio channel, wherein the other control information except the ACK information is encoded according to a channel encoding scheme without spreading prior to transmission, and the ACK information is transmitted on a plurality of subcarriers mapped in a pattern to increase diversity prior to transmission;
    decoding the other control information according to the channel encoding scheme; and performing an inverse of the applying on the received ACK information.

23. The method of claim 22, wherein the sequence is a walsh code.

24. The method of claim 22,
wherein the receiving and demultiplexing of the ACK information and the other control information comprises:
demultiplexing the ACK information and the other control information;
receiving the demultiplexed other control information through a designated path; and
receiving the demultiplexed ACK information through another designated path.

25. The method of claim 22, wherein the spread ACK information is mapped based on an ACK channel index.

26. The method of claim 22, wherein the spread ACK information is mapped to a plurality of OFDM symbols.

27. The method of claim 22, wherein the ACK information is spread using a spreading factor as a system parameter.

28. The method of claim 22, wherein additional ACK channels are allocated based on a system parameter.

29. The method of claim 22, wherein the pattern comprises units of multiple OFDM symbols.

30. An apparatus for receiving acknowledgement (ACK) information in a terminal of an Orthogonal Frequency Division Multiplexing (OFDM) system, wherein the ACK information is spread by applying a sequence from a set of mutually orthogonal sequences prior to transmission of the ACK information, the apparatus comprising:
a reception module for receiving and demultiplexing ACK information and other control information from a radio channel, wherein the other control information except the ACK information is encoded according to a channel encoding scheme without spreading prior to transmission, and the ACK information is transmitted on a plurality of subcarriers mapped in a pattern to increase diversity prior to transmission;
a decoder for decoding the other control information according to the channel encoding scheme;
an inverse processor for performing an inverse of the applying on the received ACK information; and
a controller for controlling an operation of the inverse processor.

31. The apparatus of claim 30, wherein the sequence is a walsh code.

32. The apparatus of claim 30, wherein the ACK information and the other control information is demultiplexed in a reception process, the demultiplexed other control information being received through a designated path and the demultiplexed ACK information being received through another designated path.

33. The apparatus of claim 30, wherein the spread ACK information is mapped based on an ACK channel index.

34. The apparatus of claim 30, wherein the spread ACK information is mapped to a plurality of OFDM symbols.

35. The apparatus of claim 30, wherein the ACK information is spread using a spreading factor as a system parameter.

36. The apparatus of claim 30, wherein additional ACK channels are allocated based on a system parameter.

37. The apparatus of claim 30, wherein the pattern comprises units of multiple OFDM symbols.

38. An Orthogonal Frequency Division Multiplexing (OFDM) system for transmitting and receiving acknowledgement (ACK) information, the system comprising:
a transmitter for spreading the ACK information separately from other control information by applying a sequence from a set of orthogonal sequences for transmission, mapping the spread ACK information to subcarriers in a pattern for increasing diversity gain of the ACK information for transmission, encoding the other control information except the ACK information according to a channel encoding scheme without spreading, and multiplexing the ACK information mapped to the subcarriers with the encoded other control information to transmit; and
a receiver for demultiplexing the ACK information and the other control information received from a radio channel, decoding the other control information except the ACK information according to the channel encoding scheme, and performing an inverse of the applying on the received ACK information.

39. The system of claim 38, wherein the spread ACK information is mapped based on an ACK channel index.

40. The system of claim 38, wherein the spread ACK information is mapped to a plurality of OFDM symbols.

41. The system of claim 38, wherein the sequence is a walsh code.

42. The system of claim 38, wherein the ACK information is spread using a spreading factor as a system parameter.

43. The system of claim 38, wherein additional ACK channels are allocated based on a system parameter.

44. The system of claim 38, wherein the pattern comprises units of multiple OFDM symbols.

* * * * *